UNITED STATES PATENT OFFICE.

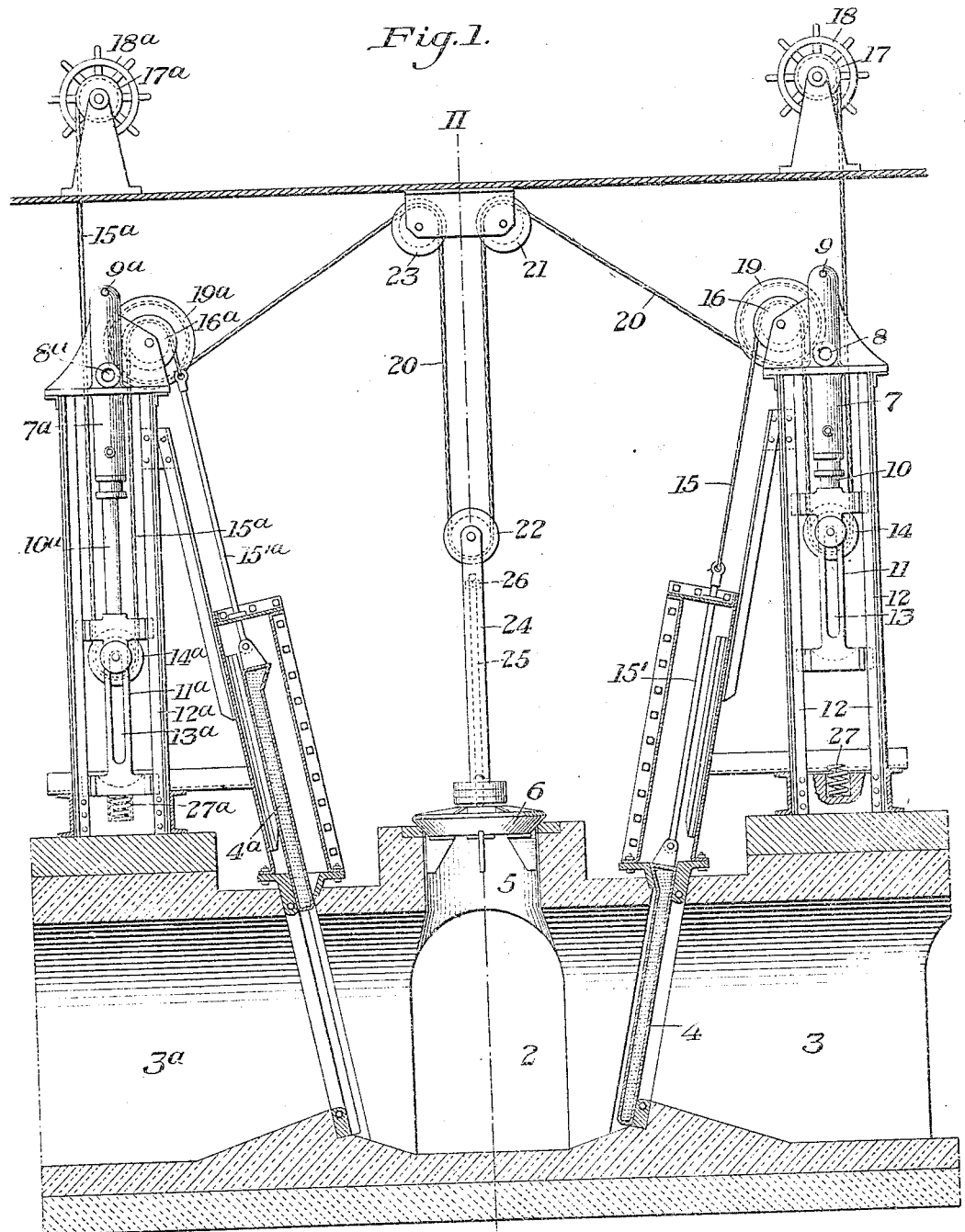

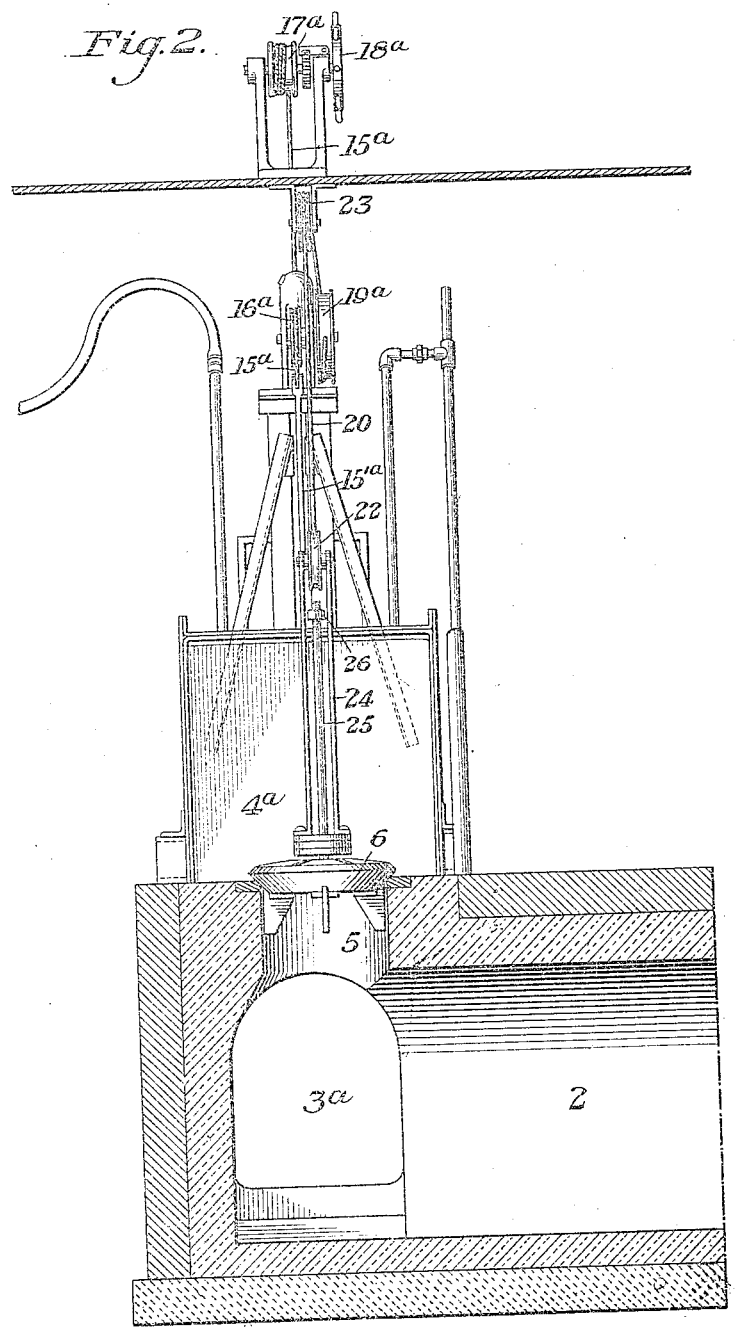

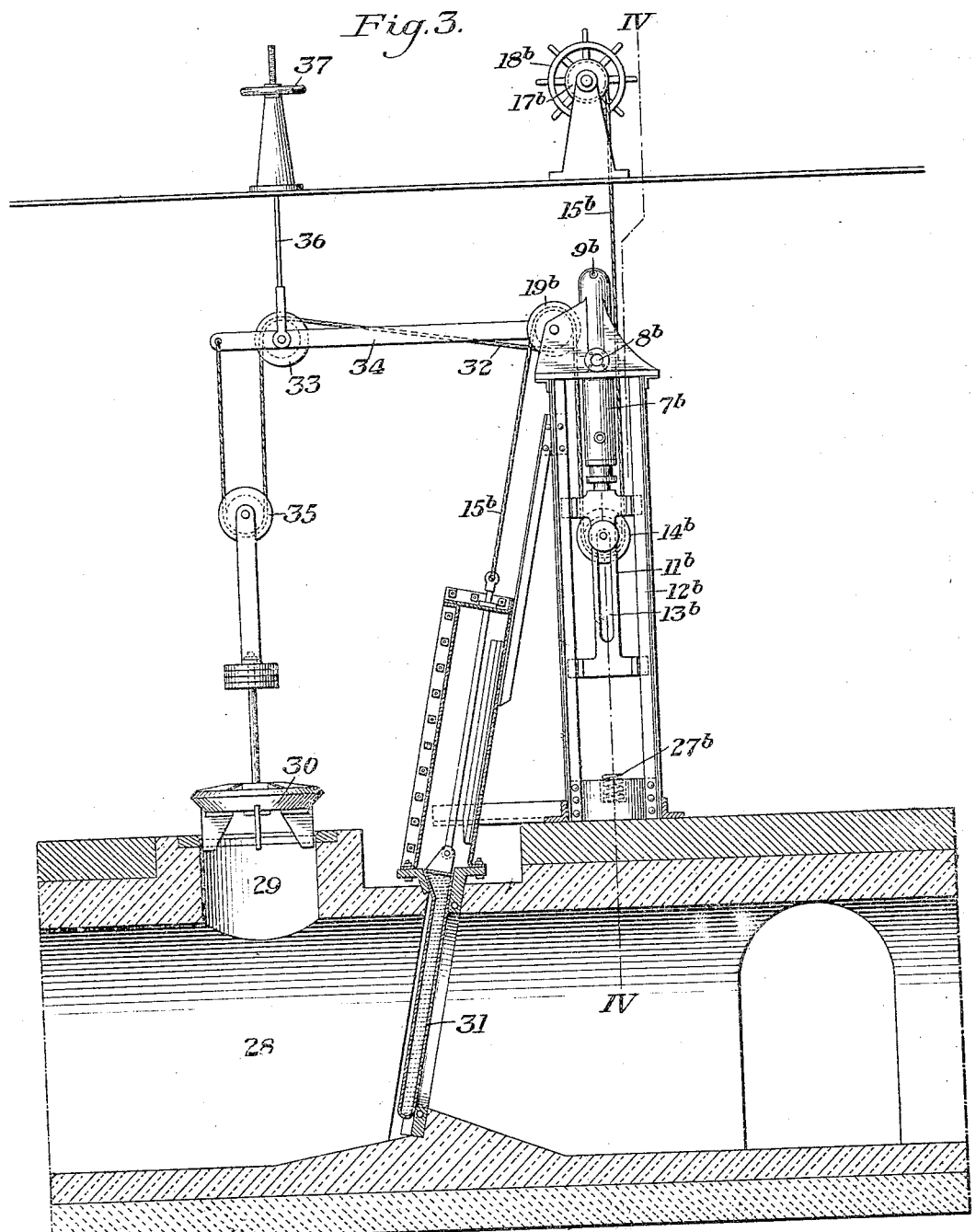

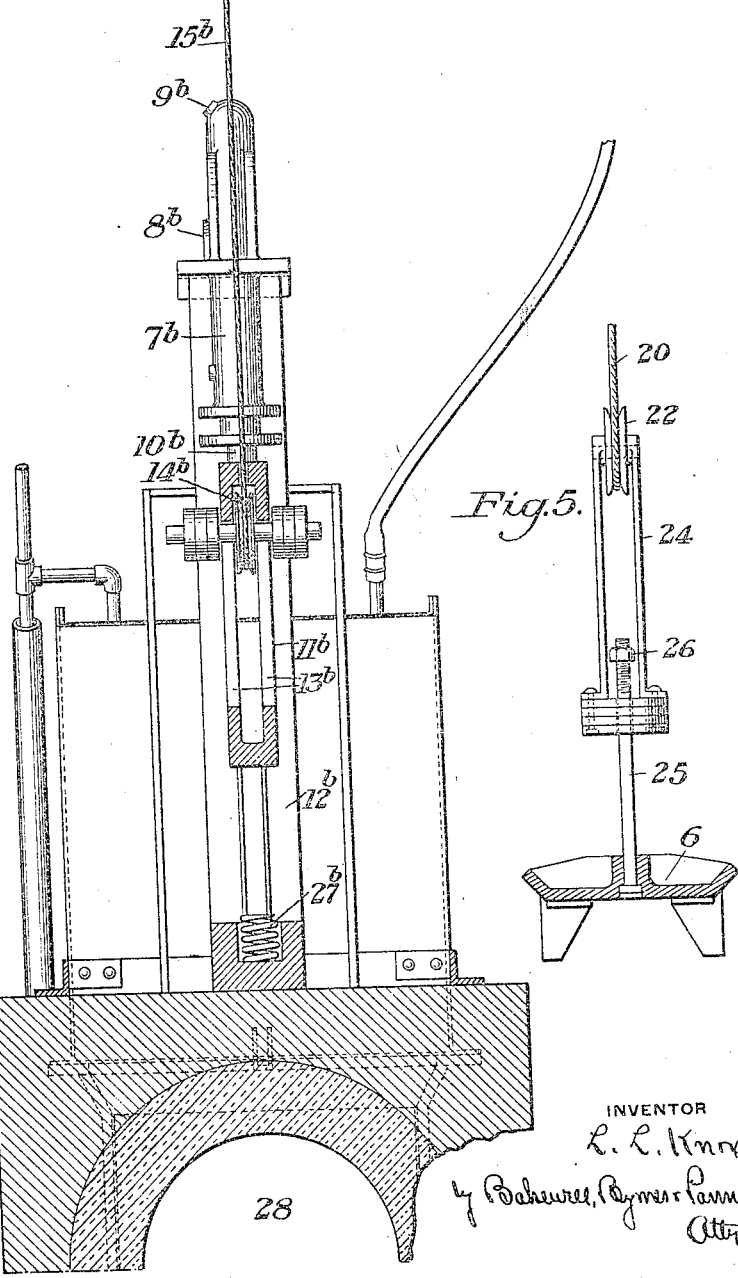

LUTHER L. KNOX, OF AVALON, PENNSYLVANIA, ASSIGNOR TO BLAW-KNOX COMPANY, OF PITTSBURGH, PENNSYLVANIA, A CORPORATION OF NEW JERSEY.

VALVE-OPERATING SYSTEM.

1,251,788.  Specification of Letters Patent.  Patented Jan. 1, 1918.

Application filed December 21, 1916. Serial No. 138,290.

*To all whom it may concern:*

Be it known that I, LUTHER L. KNOX, a citizen of the United States, residing at Avalon, Allegheny county, Pennsylvania, have invented a new and useful Valve-Operating System, of which the following is a full, clear, and exact description, reference being had to the accompanying drawings, forming part of this specification, in which—

Figure 1 is a sectional elevation of a valve operating system embodying my invention.

Fig. 2 is a section on the line II—II of Fig. 1.

Figs. 3 and 4 are views respectively similar to Figs. 1 and 2, but showing a modification, and Fig. 5 is a detail view showing the connection between the air valve and its actuating mechanism.

My invention has relation to valve operating systems, and more particularly to mechanism of this character which is especially adapted for use in connection with the valves of the air and gas flues of reversing regenerative furnaces.

An object of my invention is to provide simple and effective mechanism of this character for effecting the operation of a plurality of valves by a single motive device.

Another object of the invention is to provide mechanism of this character having a system in which the motive devices for operating the reversing valves are interconnected with each other and with an air inlet valve in such a manner that the operation of either reversing valve will also effect an operation of the air inlet valve.

A still further object of the invention is to provide a system of this character having means whereby the extent of opening movement of the reversing valves may be readily controlled without changing the operation of the motive devices therefor.

The nature of my invention will be best understood by reference to the accompanying drawings, in which I have shown the preferred embodiment thereof, and which will now be described, it being premised, however, that various changes may be made in the details of construction and arrangement of the parts without departing from the spirit and scope of my invention as defined in the appended claims.

Referring first to that form of my invention shown in Figs. 1 and 2, the numeral 2 designates a gas supply flue having a branch 3 which leads in the usual manner to one end of a reversing furnace (not shown), and an opposite branch 3ª which leads to the opposite end of such furnace. 4 and 4ª designate two gas reversing valves. These valves may be of any suitable type and character. In the drawing I have shown them as being of the sliding damper type and consisting of hollow water cooled bodies. Preferably these valves are arranged to seat obliquely across the flues. 5 designates an air inlet placed between the two valves 4 and 4ª and controlled by the valve 6. This air inlet is for the purpose of momentarily admitting a small amount of air to the gas flue leading to each end of the furnace after the closing of the gas inlet control valve (not shown), and before actuating the gas reversing valves.

Each valve 4 and 4ª is provided with a separate actuating motor. These two motors may be in all respects duplicates of each other, and one of them will be described in detail, and corresponding reference numerals, with the letter "a" affixed thereto, applied to similar parts of the other one.

7 designates a single acting hydraulic cylinder having an admission port 8 and an exhaust port 9. The downwardly moving plunger 10 of this cylinder carries a cross-head 11 which slides in the vertical guides 12. The intermediate vertical portion of the cross-head is provided with an elongated vertical slot 13 in which is mounted the shaft or neck of a weighted sheave 14. 15 is a cable connected at one end to the valve 4 by means of a rod or link 15', and thence extending upwardly over a sheave 16, thence downwardly and around the weighted sheave 14, and thence upwardly and connected at its upper end to a drum 17 having an actuating wheel 18. The sheave 16 has connected thereto another sheave 19 shown as of larger diameter than the sheave 16 and to which is connected one end of a cable 20. This cable 20 passes from the sheave 19 upwardly and over a guide pulley 21, thence downwardly and under a sheave 22 connected to the valve 6 in a manner presently to be described; thence upwardly and around another guide sheave 23 and thence downwardly; its opposite end being connected to the sheave 19ª of the other motive device.

The sheave 22 is journaled at the upper portion of a vertical weighted yoke 24 which has a sliding engagement with the stem 25 of the valve 6. The upper end of this valve stem is preferably provided with an adjustable nut 26 for varying the sliding movement of the yoke thereon.

27 designates a buffer or shock absorber for the cross-head 11.

The operation is as follows: Assuming the parts to be in the position shown in Fig. 1, and that it is desired to reverse the furnace, the gas inlet valve (not shown) is first closed. The exhaust $9^a$ of the cylinder $7^a$ is then opened, whereupon the weight of the valve $4^a$ will cause it to move downwardly, and this movement will force upwardly the plunger $10^a$, the liquid in the cylinder exhausting at $9^a$. This downward movement of the valve $4^a$ will actuate the sheave $19^a$ to wind up on the left hand end portion of the cable 20, thereby raising the valve 6 and admitting air through the port 5 into the flue $3^a$ prior to the closing of the valve $4^a$. This air will blow the gas in the flue $3^a$ into the furnace and thus insure its consumption prior to the reversal. Power is then admitted to the cylinder 7 of the other motive device, thereby forcing its plunger 10 downwardly and opening the valve 4. At the beginning of this movement the turning of the sheave 19 will slack the cable 20, and valve 6 will close of its own weight. The gas inlet control valve is then opened.

It will be noted that the weight of the valves will always tend to hold the sheaves 14, $14^a$ at the limit of their upward movement in the slots of the cross-heads. The amount of movement of each cross-head is substantially one-half of the full movement of the corresponding valve, this movement of the cross-head effecting a full movement of the valve, owing to the fact that the cable 15 is doubled around the sheave 14. It is desirable at times, however, to limit the opening movements of the valves 4 and $4^a$ so that they will not be opened to their full extent. This can be readily accomplished in the arrangement shown by actuating the hand-wheel 18 to thereby slack the cable 15. This will permit the sheave 14 to drop part way down the slot 11; and when power is subsequently admitted to the cylinder 7, the first part of the movement of the plunger 10 will be an idle movement until such time as the cross-head again comes in contact with the sheave 14. The valve 4 will then commence to open, but it will be apparent that the full stroke of the cylinder will only open the valve part way, this depending upon the amount to which the cable 15 is slacked. In a similar manner the slacking of the cable $15^a$ will permit the valve $4^a$ to drop to a corresponding extent. In this manner I provide means whereby the extent of movement of the valves may be accurately adjusted without changing the stroke of the motor plungers.

The modification shown in Figs. 3 and 4 shows the application of my invention to one of the air flues of the valve and flue system of a reversing furnace.

In this form of my invention the numeral 28 designates one of said air flues having the air inlet port 29 controlled by the valve 30 which is similar to the valve 6 before described. 31 designates one of the air reversing valves which is shown as being similar in structure and arrangement to the valves 4 and $4^a$ of the form first described. The motive device for the valve 31 is in all respects similar to the motive devices before described, and corresponding reference numerals have been applied thereto, with the letter $b$ affixed. In this form of my invention, the actuating cable 32 for the valve 30 passes from the sheave $19^b$ over a sheave or pulley 33, which is mounted on a pivoted lever arm 34. From the sheave or pulley 33 the cable 32 passes downwardly around the sheave 35 (which is connected to the stem of the valve 30 in the same manner that the sheave 32 is connected to the valve 6), and thence upwardly, its other end being connected to the end of the lever arm 34. 36 is a connection whereby the arm 34 may be raised and lowered by the operation of a hand-wheel 37.

In this form of my invention the closing of the valve 31 will effect the opening of the valve 30; and the opening of valve 31 will effect the closing of the valve 30. The extent of opening of the valve 30 may be controlled by means of the connection 36; and, if desired, for any purpose, said connection may be operated sufficiently to allow the valve 30 to remain on its seat notwithstanding the closing of the valve 31, or to remain open notwithstanding the opening of the valve 31.

My invention provides a valve actuating mechanism of the character described which is simple in its construction, arrangement, and mode of operation. The operation of the motive device for the air reversing valve effects the proper operation of the air inlet valve. The provision of means whereby the extent of opening of the reversing valve may be varied without changing the stroke of the motor is also important, since this, together with the arrangement of the parts whereby the valves seat by their own gravity when the motor exhausts are open, permits the use of simple single acting hydraulic motors.

I claim:

1. In valve mechanism of the character described, the combination of a vertically movable valve, a cross-head, a vertically positioned hydraulic cylinder operatively connected with said cross-head, a member having a shiftable connection with said cross-head, an actuating connection between said member and the valve, and means for shifting said member with respect to the cross-head, substantially as described.

2. In valve mechanism of the character described, the combination of a vertically movable valve, a single acting hydraulic cylinder, a downwardly movable cross-head connected to the plunger of said cylinder, said cross-head having a vertical slot therein, a sheave movably mounted in said slot, an actuating cable connected to the valve and passing around said sheave, and an adjusting device also connected to said cable, substantially as described.

3. In valve mechanism of the character described, the combination with a vertically movable valve, of a single acting hydraulic cylinder for actuating the valve, a member having a movable connection with the plunger of said cylinder, an actuating cable connected to the valve and engaging said member, and means for varying the length of said cable, substantially as described.

4. In valve mechanism of the character described, the combination of a vertically movable valve, a cross-head, a hydraulic cylinder operatively connected with said cross-head, a movable member which has a shiftable connection with the cross-head and also has a connection with the valve, and manually operative means for shifting said member with respect to the cross-head; substantially as described.

5. In valve mechanism of the character described, the combination of a vertically movable valve, a cross-head, a hydraulic cylinder operatively connected with said cross-head, a movable member which has a shiftable connection with the cross-head and also has a connection with the valve, and manually operative means for shifting said member with respect to the cross-head, together with another vertically movable valve member, and an actuating connection therefor, which is operated by the movement of the first named valve member; substantially as described.

6. In valve mechanism of the character described, the combination of a vertically movable valve member, a hydraulic cylinder for actuating said valve member, a flexible connection between the plunger of said cylinder and said valve member, a sheave over which said connection passes, a second valve member and an actuating connection for the second valve and itself actuated by said sheave, there being a lost motion connection between the second named valve member and its actuating connection, substantially as described.

7. In valve mechanism of the character described, the combination of two movable valves, a separate motive device operatively connected with each valve member, and a third valve having an actuating connection with the actuating mechanism of each of the first named valves, substantially as described.

8. In valve mechanism of the character described, the combination of two movable valves, a separate motive device operatively connected with each valve member, and a third valve having an actuating connection with the actuating mechanism of each of the first named valves, the actuating connection for the third valve having lost motion elements therein, substantially as described.

9. In valve mechanism of the character described, the combination of two movable valves, a separate actuating motor for each of said valves, a member actuated by the movement of each of said valves, a third valve and an actuating connection between the third valve and each of the said members, substantially as described.

In testimony whereof, I have hereunto set my hand.

LUTHER L. KNOX.

Witnesses:
 Geo. H. Parmelee,
 H. M. Corwin.